United States Patent [19]

Gessel et al.

[11] Patent Number: 4,706,448
[45] Date of Patent: Nov. 17, 1987

[54] SNAP-AWAY HARVESTER TINE

[75] Inventors: James M. Gessel, Romeoville; Edward P. Jasper; Gary L. Kunz, both of Mendota, all of Ill.

[73] Assignee: HCC, Inc., Mendota, Ill.

[21] Appl. No.: 830,934

[22] Filed: Feb. 19, 1986

[51] Int. Cl.$^4$ ............................................. A01D 57/02
[52] U.S. Cl. ........................................................ 56/400
[58] Field of Search ................ 56/219, 220, 221, 226, 56/227, 400

[56] References Cited

U.S. PATENT DOCUMENTS

| | | | |
|---|---|---|---|
| Re. 24,825 | 5/1960 | Gustafson | 56/400 |
| 2,603,933 | 7/1952 | Shore | 56/400 |
| 2,713,241 | 7/1955 | West | 56/400 |
| 3,066,470 | 12/1962 | Johnston | 56/400 |
| 3,175,347 | 3/1965 | Scheidenhelm | 56/220 |
| 3,282,408 | 11/1966 | Lohrentz | 56/227 |
| 3,613,346 | 10/1971 | Hubbard | 56/400 |
| 3,616,631 | 11/1971 | Quam | 56/400 |
| 3,698,166 | 10/1972 | Fisher | 56/220 |
| 3,765,159 | 10/1973 | Neff | 56/400 |
| 4,520,620 | 6/1985 | Gessel | 56/400 |

Primary Examiner—Stephen J. Novosad
Assistant Examiner—William P. Neuder
Attorney, Agent, or Firm—Martin Fruitman

[57] ABSTRACT

A snap-away auxiliary tine for harvester reels. The tine is attached to its supporting shaft by a split cylinder which partially encloses a shaft fitting. Rounded axial grooves in the inside of the split cylinder interlock with splines on the shaft fitting and prevent normal rotation of the tine. Extreme force on the tine, such as that when the tine hits a hard object, causes the split cylinder to spread slightly, disengage the grooves and rotate on the shaft, thus preventing tine breakage. Manual rotation repositions the tine.

12 Claims, 2 Drawing Figures

SNAP-AWAY HARVESTER TINE

SUMMARY OF THE INVENTION

This invention deals generally with harvesters and more specifically with raking and loading and a force-relieved rake tine which prevents tine breakage.

The problem of tine breakage on rakes is a very common one. Broken tines are a frequent occurrence both in hand rakes and rotating harvester reels, because there are always rocks and other objects which a rake encounters while moving over the land to be harvested. Numerous rake designs and patents exist which testify to the continuing efforts to solve the problem. For instance many tines have been spring or rubber mounted so they will yield to the forces caused by an obstruction. Another approach is to use a tine which will itself flex and absorb the shock of hitting the obstruction. However, regardless of the designs used, the difficulty in moving the tine completely out of the way of a solid obstruction invariably leads to broken tines.

This problem is particularly exaggerated for auxiliary tines, those tines which are attached on the very end of harvester reel shafts to extend the pick-up width. These auxiliary tines are unshielded, do not share load with any others, and because of their outrigger location more frequently hit obstructions. It can easily be appreciated that no matter how resilient a tine is, or no matter how much deflection its mounting system will permit, there will be obstructions which surpass the design limits of any flexing system and which will break or permanently distort the tine.

The present invention, however, overcomes this limitation by using a system which does not depend on the resiliency of the system to directly counteract the force of the obstruction. Rather, it is designed to yield to a force surpassing a predetermined limit and to require resetting into its working position. This approach, in conjunction with a conventional somewhat flexible tine, essentially moves the tine out of the way rather than permit it to be broken. To the harvester operator it means that, after hitting an obstruction, the tine need only be reset, rather than completely replaced. The reset procedure is a simple one requiring no tools and only a moment, as opposed to the replacement of a tine which is complex enough so that it is rarely done in the work field. Field tests have shown that even when the harvester continues operation with the tines out of position, the tines will often automatically reset themselves due to forces applied by the material being harvested.

The present invention involves a specially constructed tine and tine mounting fitting. The tine finger itself can be similar in structure to the tine described in U.S. Pat. No. 4,520,620 in that it is generally structured of flexible material and is tapered to permit flexing, particularly in the plane of the motion which the harvester reel imparts to the tine. Although the tine pictured in the referenced patent is typical, the present invention can actually be used with tines of any construction, since it deals essentially with the apparatus for attaching the tine to its bat or mounting shaft.

The snap-away tine of the present invention is attached to the harvester reel by means of a split ring configuration at the top of the tine which grips an essentially cylindrical shaft fitting. However, the tine and the shaft fitting include two pairs of interlocking detents which, in the preferred embodiment are axial grooves and splines similar to shaft keys, in order to prevent rotation under normal use conditions. The groove is located on the inside diameter of the split ring which is on the end of the tine, and the spline is located on the shaft fitting, and, unlike the typical shaft key, they are both rounded and semicircular in cross section. The rounded cross section permits the interlocking spline and groove to separate and release under appropriate conditions as the split cylinder expands.

The appropriate condition for a harvester reel tine is when a force on the tine tip or body is so great that breakage or permanent deformation of the tine is likely. It is in such a circumstance that the groove in the tine split cylinder is forced off of or past the spline on the shaft fitting by expansion of the split cylinder, and the tine is permitted to rotate on the shaft. Clearly, such a movement is more desirable than permanent damage to the tine. Particularly when resetting the tine into position is a simple matter.

The resetting requires no tools. It is accomplished by simply turning the tine on the shaft manually, in a direction opposite the force applied by the conveyed material, until the splines and grooves once more interlock, at which time the tine is once more in working position. The force to rotate the tine in the opposite direction of its usual force is considerably less. This simple field resetting permits the harvesting to continue with only the slightest delay even after the harvester reel tine hits a solid object.

DETAILED DESCRIPTION OF THE INVENTION

Figure 1:
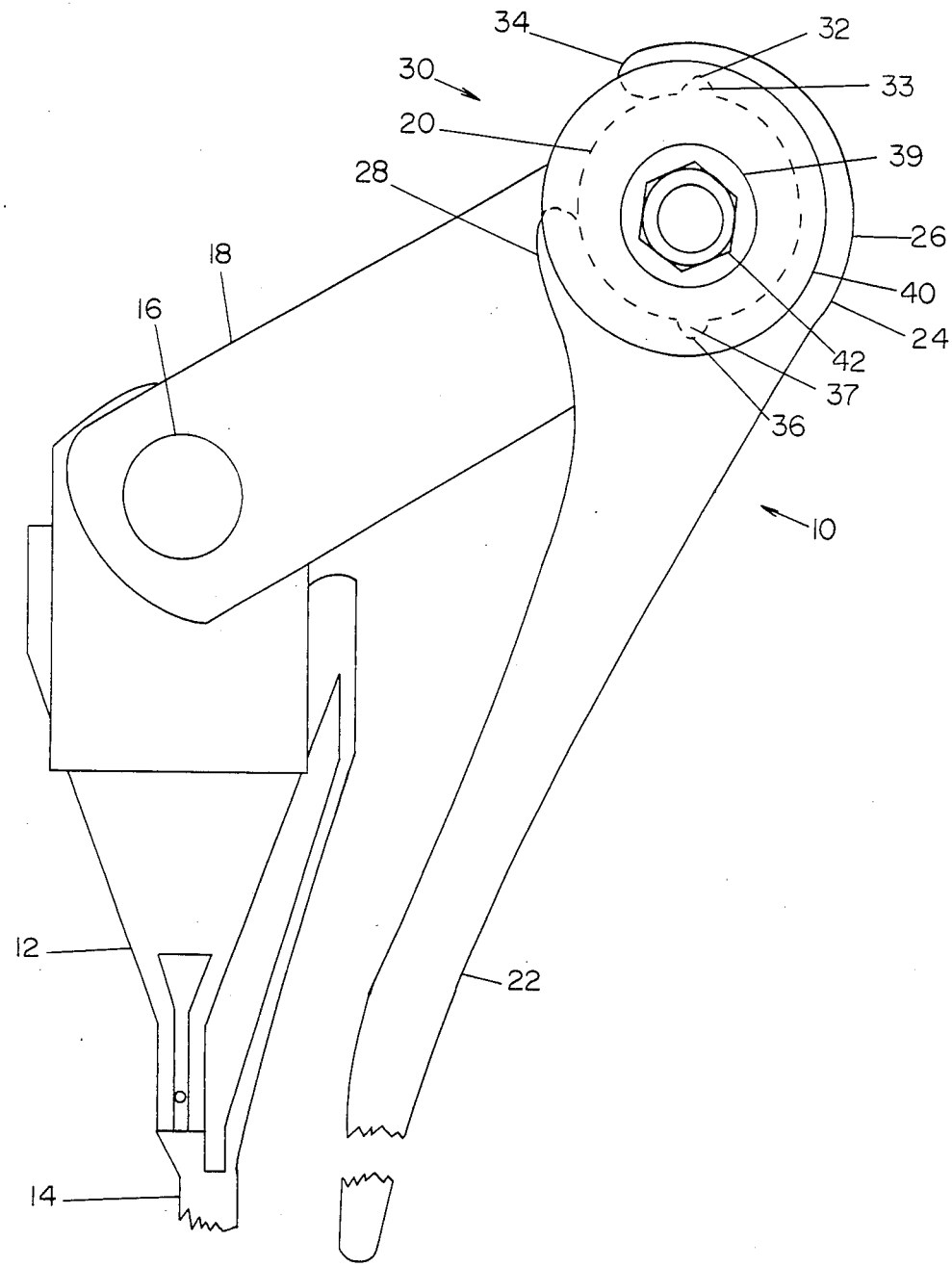
FIG. 1 is a side view of the preferred embodiment of the invention installed as an auxiliary harvester reel tine.

The preferred embodiment of the invention is shown in FIG. 1 in use as an auxiliary tine on a harvester reel. In such an application tine 10 (which is pictured with a break due to space limitations) is attached in outrigger fashion to reel bat 12 to which the other reel tines 14 are attached. Auxiliary tine 10 is attached to reel shaft 16 by arm 18 to which shaft fitting 20 is connected. It is tine 10 and shaft fitting 20 which are the basis of the present invention.

Tine 10 is constructed essentially of finger 22 and split cylinder 24. Finger 22 is of conventional construction. It is generally built to have some resiliency so that minor shocks along its length, such as those caused by it hitting a stone or a rise in the ground, are absorbed without damage by the flexing of finger 22. However, no matter how finger 22 is constructed, there invariably is a limit of force beyond which there will be permanent damage to finger 22, and it is that situation which is addressed by split cylinder 24 and its detents.

In the preferred embodiment split cylinder 24 is constructed integral with finger 22 and of the same material. Its two segments 26 and 28 wrap around opposite sides of shaft fitting 20, but are separated by gap 30. Both segments 26 and 28 are constructed to have some flexibility, but segment 26, since it is longer and has portions with thinner cross section, is somewhat more flexible. The geometry of their cylindrical construction causes this flexibility to operate in a direction radial to the cylinder which is formed by segments 26 and 28, that is, to cause them to separate or move closer as they flex. The dimensions of split cylinder 24 are designed so that segments 26 and 28 normally fit snugly around shaft fitting 20.

Segment 26 includes semicircular groove 32 in the region of its tip 34 to act as a detent. This location is selected because the inherent flexibility of segment 26 permits tip 34 to have the greatest deflection when radial forces are applied to the inside surfaces of split cylinder 24. A balancing semicircular groove 36 is located in split cylinder 24 diametrically opposite from groove 32. Groove 36 is located, in the preferred embodiment, at the most rigid part of split cylinder 24, that location at which finger 22 and split cylinder join together.

Grooves 32 and 36 fit over matching semicircular splines 33 and 37 on shaft fitting 20. Therefore, during normal use, when the grooves and splines are interlocked, tine 10 will not rotate relative to shaft fitting 20.

The function of the present invention can best be appreciated if the spline and groove combination is imagined to be the shape of normal shaft keys, that is with flat sides oriented in radial direction relative to the shaft. In such a circumstance tine 10 could not turn on shaft 20 unless some part were damaged, and that is just what would happen when forces on the tip of tine 10 surpassed the strength of tine finger 22.

However, with the splines and grooves of semicircular shape as they are in this preferred embodiment, when the turning force surpasses a particular limit determined largely by the height of the splines and depth of the grooves, the grooves will rise up over the splines and tine 10 will "snap-away" from its original position. This action is also controlled by the flexibility of split cylinder segment 26 which is the part which deflects radially so that grooves 32 and 36 can move over splines 33 and 37.

It is apparent that once the splines are out of the grooves they maintain split cylinder 24 somewhat spread apart, and the reduced friction caused by the limited contact between only the tops of the splines and single lines on the surface of the inside cylinder permit tine 10 to rotate relatively freely on shaft fitting 20. Resetting of tine 10 to its working position therefore requires only a relatively small force, easily furnished manually without tools, to move tine 10 back to its normal position where it will "snap-in".

Figure 2:
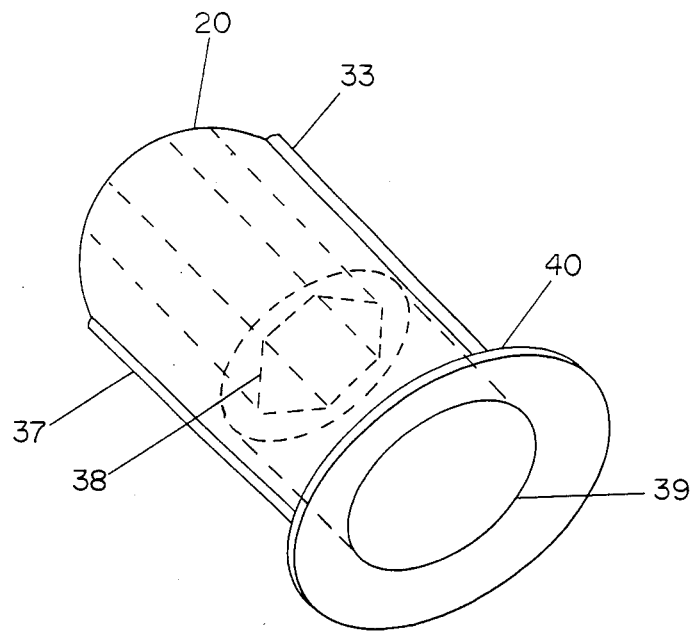
FIG. 2 is a perspective view of the shaft fitting used in the preferred embodiment of the invention.

Shaft fitting 20 is pictured in perspective view in FIG. 2. Such a fitting is used when tine 10 is used as pictured, as an auxiliary in an outrigger position. Shaft fitting 20 is simply constructed with an outside surface cylinder with splines 33 and 37 on it, the splines for the preferred embodiment being half round in cross section. Core hole 38 is shaped to prevent turning on its matching shaft (not shown). In the preferred embodiment core hole 38 is generally hexagonal in cross section, but includes counterbore 39 into which nut 42 is recessed to prevent entanglement with the crop material. Lip 40 on the end of shaft fitting 20 is used simply to prevent the snap-away tine from moving axially along the shaft. A washer is placed on the opposite end to prevent axial movement in that direction. Shaft fitting 20 is normally held in position on arm 18 by means of a hex shank bolt and nut 42. Arm 18 has a hex hole to prevent rotation of the hex bolt (not seen) which also holds shaft fitting 20 in position.

As can be appreciated from the foregoing description, the present invention provides a practical apparatus for overcoming reel tine breakage, while permitting the easy resetting of tines which have been subjected to the inevitable usually destructive external force.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a greater or lesser number of splines and grooves could be used on the tine-shaft combination, a different cross section shape such as wedge shaped slope, could be used on them, or the location of the grooves and splines could be interchanged with the spline on the tine. Moreover, the snap-away tine could be used not just as an auxiliary tine, but, with proper splines along the length of a tine shaft, for all the tines on a harvester reel.

Furthermore, another application of the invention is its use in conjunction with the sensing system of an automatically adjustable header. Such a system uses sensing rods on the ends of the header. Each rod is attached to a pivoting shaft and senses the ground location. Use of the snap-away configuration to attach the sensing rod to its shaft prevents damage to the rod which otherwise occurs under extreme conditions.

What is claimed as new and for which Letters Patent of the United States are desired to be secured is:

1. A harvester tine which survives extreme external forces, comprising:
   a shaft fitting attached to the harvester reel, said shaft fitting having a generally cylindrical outside surface and including at least one detent located on the outside surface; and
   a tine, including a finger and a split cylinder attached to one end of the finger, the split cylinder being shaped and dimensioned to engage the cylindrical outside surface of the shaft fitting and also including at least one detent which is shaped and oriented to interlock with the detent on the shaft fitting, the shaft fitting detent and the split cylinder detent being constructed to release from each other upon the application of a predetermined rotational force upon the finger, so that the entire split cylinder rotates as a unit on the shaft fitting only after release of the detents, and the split cylinder remains engaged with the shaft fitting after release of the detents.

2. The harvester tine of claim 1 wherein the split cylinder is constructed so as to expand to aid release of the detents.

3. The harvester tine of claim 1 wherein the shaft fitting detent is a spline and the split cylinder detent is a groove.

4. The harvester tine of claim 3 wherein the spline and groove are of semicircular cross section.

5. The harvester tine of claim 1 wherein there are two shaft fitting detents and two split cylinder detents.

6. The harvester tine of claim 5 wherein the two detents on the split cylinder are located diametrically opposite from each other.

7. A shaft mounted apparatus which survives extreme rotational forces, comprising:
   a shaft fitting having a generally cylindrical outside surface and including at least one detent located on the outside surface; and an apparatus connected to the shaft fitting, including a body and a split cylinder attached to one end of the body, the split cylinder being shaped and dimensioned to engage the cylindrical outside surface of the shaft fitting and also including at least one detent which is shaped and oriented to interlock with the detent on the shaft fitting, the shaft fitting detent and the split cylinder detent being constructed to release from each other upon the application of a predetermined rotational force upon the body, so that the entire split cylinder rotates as a unit on the shaft fitting only after release of the detents, and the split cylinder remains engaged with the shaft fitting after release of the detents.

8. The shaft mounted apparatus of claim 7 wherein the split cylinder is constructed so as to expand to aid release of the detents.

9. The shaft mounted apparatus of claim 7 wherein the shaft fitting detent is a spline and the split cylinder detent is a groove.

10. The shaft mounted apparatus of claim 9 wherein the spline and groove are of semicircular cross section.

11. The shaft mounted apparatus of claim 7 wherein there are two shaft fitting detents and two split cylinder detents.

12. The shaft mounted apparatus of claim 11 wherein the two detents on the split cylinder are located diametrically opposite from each other.

* * * * *